United States Patent
Malina et al.

(10) Patent No.: US 7,216,844 B2
(45) Date of Patent: May 15, 2007

(54) VALVE WHICH ENABLES EASY OPERATION OF A CLOSURE MECHANISM AT ANY INTERNAL VALVE PRESSURE

(75) Inventors: Petr Vasilievich Malina, ul. Yablochkova, 35-77, Moscow, 127322 (RU); Aleksandr Viktorovich Kurlov, Kiev (UA)

(73) Assignee: Petr Vasilievich Malina, Moscow (RU)

( * ) Notice: Subject to any disclaimer, the term of this patent is extended or adjusted under 35 U.S.C. 154(b) by 28 days.

(21) Appl. No.: 10/476,168

(22) PCT Filed: Jun. 6, 2002

(86) PCT No.: PCT/RU02/00280

§ 371 (c)(1),
(2), (4) Date: Jul. 12, 2004

(87) PCT Pub. No.: WO02/101270

PCT Pub. Date: Dec. 19, 2002

(65) Prior Publication Data

US 2004/0238779 A1  Dec. 2, 2004

(30) Foreign Application Priority Data

Jun. 8, 2001  (RU) .............................. 2001115576

(51) Int. Cl.
*F16K 31/50*  (2006.01)

(52) U.S. Cl. ...................... 251/214; 251/218; 251/266; 251/273; 251/345

(58) Field of Classification Search ........ 251/266–269, 251/273, 343–345, 214, 229, 218
See application file for complete search history.

(56) References Cited

U.S. PATENT DOCUMENTS 1,477,154 A * 12/1923 Springborn ................. 251/268
1,728,077 A * 9/1929 Moyer ......................... 251/266
1,976,796 A * 10/1934 Milner ........................ 251/266
2,105,681 A    1/1938 Armstrong
4,860,784 A * 8/1989 Petersen et al. ............. 251/267
5,971,007 A * 10/1999 Harcourt et al. ............ 251/267

FOREIGN PATENT DOCUMENTS

| DE | 3834173 A1 | 4/1990 |
| GB | 1354239 A | 5/1974 |
| RU | 2159857 C2 | 11/2000 |
| RU | 2 163 318 C1 | 2/2001 |
| SU | 93019 A | 12/1961 |

* cited by examiner

*Primary Examiner*—John Bastianelli
(74) *Attorney, Agent, or Firm*—Frishauf, Holtz, Goodman & Chick, P.C.

(57) ABSTRACT

The invention relates to pipeline accessories and can be used for working medium flow control in pipelines in particular the pipelines having a high pressure and flow rate of working fluid. Technical result is achieved due to the fact, that the inventive valve comprises a body provided with inlet and outlet holes, a valve seat, a closure, connected to a drive and seal assemblies, where the body comprises a cylindrical insert and the closure is embodied in the form of a hollow sleeve consisted of two coupled cylindrical parts, the external diameter of the part thereof contacting the body constituting 0.9-1.1 of the internal diameter of the part thereof contacting the insert.

Figure 1:
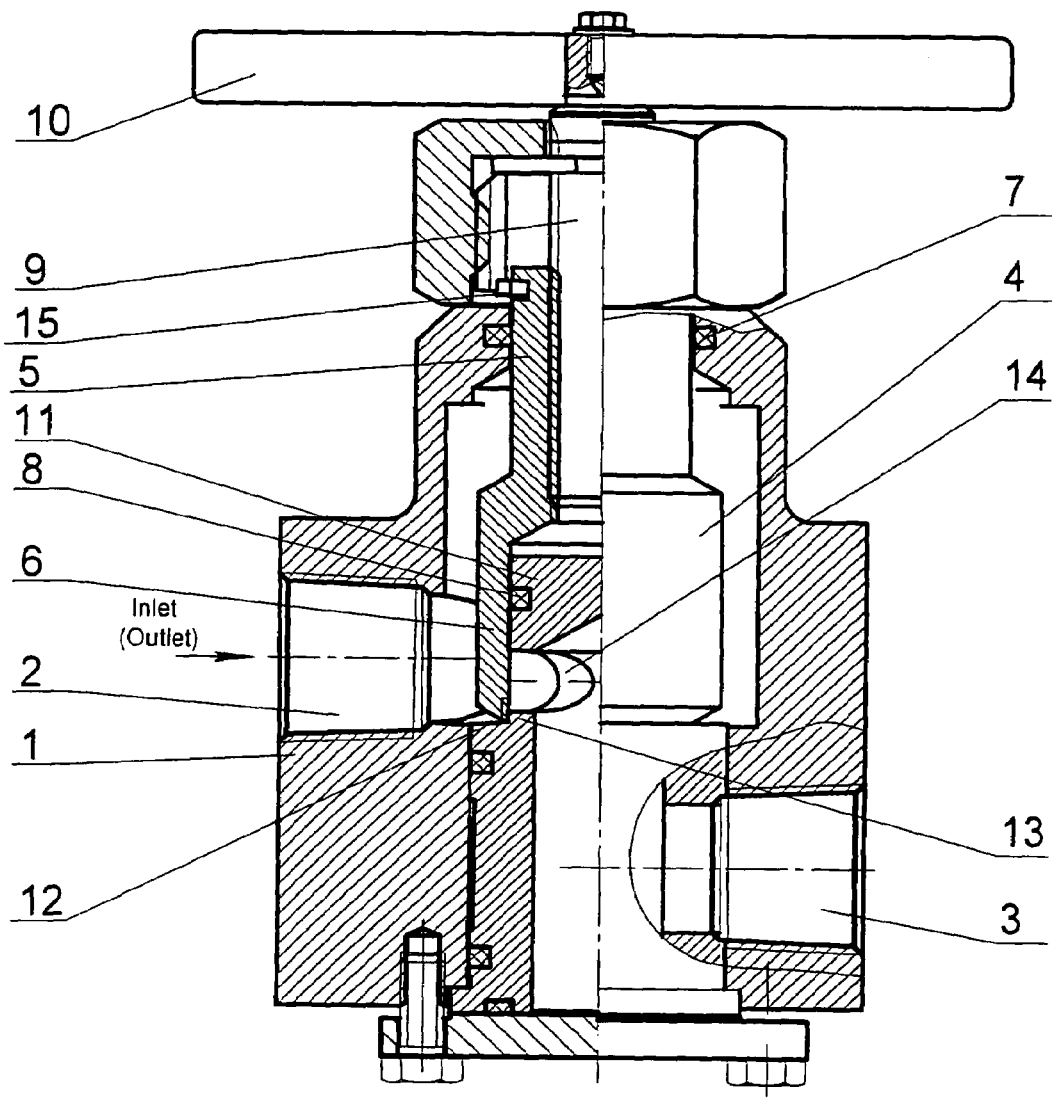

Said invention makes it possible to reduce the forces for moving the closure and increase the stable operation of the valve. The inventive valve is characterized with respect to existing valves in that it ensures the stability of operational characteristics at any pressure of the medium.

4 Claims, 4 Drawing Sheets

VALVE WHICH ENABLES EASY OPERATION OF A CLOSURE MECHANISM AT ANY INTERNAL VALVE PRESSURE

This application is a U.S. National Phase Application under 35 USC 371 of International Application PCT/RU02/00280filed Jun. 6, 2002.

The invention relates to pipeline accessories and can be used for working medium flow control in pipelines in particular the pipelines having a high pressure and flow rate of working fluid.

A valve is known (U.S. Pat. No. 2,163,318 of Feb. 20, 2001) comprising a body, provided with inlet and outlet holes, a valve seat and a closure, embodied in the form of a disc.

The disadvantage of the abovementioned valve consists in the necessity of applying considerable forces to the closure while opening or closing it, so as to overcome the pressure of the working medium on the closure. Said disadvantage makes the use of the valve in pipelines with high pressure of working medium and/or high flow rates problematic, as the force, acting on the valve under the influence of working medium pressure increases in direct proportion to the pressure and dimensions of the closure.

A slide valve is known (U.S. Pat. No 2,159,857 of Nov. 27, 2000.) containing a cylindrical closure, blocking the outlet holes. Said design does not require the application of considerable mechanical forces to open or close the valve.

The disadvantage of said design consists in the impossibility to provide the complete leakproofness of the valve in the closed position, besides the valve leakproofness decreases considerably if the valve coupling parts treatment quality is degraded.

The valve, most resembling the invention (the USSR Authors's Certificate No 93019 of Sep. 22, 1949) contains the body provided with the inlet and outlet holes, valve seat, a closure connected to the drive and seal assemblies, said body containing cylindrical insert with the possibility of reciprocal movement along its external surface.

The disadvantage of the abovementioned valve consists in the necessity of applying considerable forces to the closure while opening or closing it, as the forces, applied to the closure, formed working medium pressures in the known design are not balanced. This may also result in auto-oscillations in the hydraulic systems, where the known valve is used, occurring in low flow rate operating mode. Such auto-oscillations, manifested by the tapping or humming of the valve may lead to the onset of hydraulic impacts in the system that can destroy the entire system altogether. Technical result, achieved with the implementation of the invention consists in the reduction of forces, applied for the movement of the closure and the increase of the valve operational stability, as there are no conditions in the hydraulic system, where the valve is used for the onset of auto-oscillations when opening and closing the valve. The valve of the claimed design joins together the advantages of the disc and the slide valves, that is high leakproofness in the closed position is provided together with the liquidation of forces, effecting the closure drive at the result of the pressure of the working medium. Besides, due to the presence of the seal assemblies the valve of the claimed design does not require any advanced quality of parts treatment to provide normal operation, as its leakproofness in the closed position is provided by the grinding in of the valve seat to the lower edge of the closure.

The claimed technical result is achieved by means of the valve, comprising a body provided with inlet and outlet holes, a valve seat, a closure, connected to a drive and seal assemblies, where the body comprises a cylindrical insert and the closure is embodied in the form of a hollow sleeve mounted in the body with the possibility of reciprocal movement along the cylindrical insert external surface. According to the invention, the sleeve consists of two coupled cylindrical parts, the external diameter of the part thereof contacting the body constituting 0.9-1.1 of the internal diameter of the part thereof contacting the insert.

The cylindrical part of the closure, connected to the drive is located in the female seal assembly, whereas the male seal assembly is located inside the second cylindrical part. The drive provides for the axial movement of the closure, whereas its lower face, contacting the valve seat is embodied in the form of the inverse truncated cone.

Due to such engineering solution the longitudinal forces, induced by the pressure of the working medium, e.g. fluid or gas, effecting the upper portion of the cylindrical part's external surface and the lower (face) portion of said cylindrical part balance each other, providing the valve's leakproofness and reducing the effort, necessary for moving the closure.

FIG. 1-4 presents a general view of the valve of the claimed design executed in different variants.

FIG. 1. The valve comprises the body 1 with the inlet 2 and outlet 3 holes, with the hole 3 provided in the lower part of the body. The mention of the hole 3 in the lower part of the body is conditional and is made so as to simplify the description of the valve parts positional relationships. Actually the valve is operational irrespective of its position in space.

The valve closure is embodied in the form of the hollow sleeve 4, comprising a cylindrical part 5, contacting the body and coupled with the cylindrical part 6, contacting the insert and having the internal diameter near equal to the external diameter of the cylindrical part 5. To ensure normal operation of the valve, the internal diameter of the cylindrical part 6 must be equal to the external diameter of the part 5. It is preferable to have these diameters strictly equal, but in some cases this requirement can considerably heighten the cost of the finished product. The cylindrical part 5 is located in the female seal assembly 7, whereas the ring male seal assembly 8 is located inside the cylindrical part 6. The cylindrical part 5 is connected to the drive, facilitating the axial movement of the closure.

The drive can be embodied for instance in the form of the screw 9, with its inner thread corresponding to the inner thread, made on the internal surface of the sleeve 4. The screw is set in motion by the flywheel 10, whereas the sleeve is locked in the position with the help of conventional means, e.g. with the help of a pin, attached to the sleeve, said pin moving in the notch of the nut, fixed on the body. The valve can also be manufactured with electromagnetic or pneumatic drive.

The external surface of the cylindrical insert 11 serves as a guide for the cylindrical part 6 of the sleeve 4. The valve seat 12 is embodied in the manner so as to provide the contact of the closure lower face surface with the working medium from the side of the inlet hole when the valve is in the closed position. That is, when the valve is in the closed position, practically the entire lower face surface of the part 6 of the closure contacts the working medium with the exception of the internal portion of the lower face surface of the closure lower part, contacting the valve seat 12. Preferred is the provision of the closure's lower edge contact with the valve seat on the minimal area, which can be achieved by way of making said edge and seat of hard alloys.

Thus the ring contact of the lesser portion of the lower face surface of the closure with the valve seat surface, enclosing the outlet hole is provided, where the lower face of the closure, contacting the seat, is embodied in the form of the truncated inverted cone. Experiments showed that the valve is operational if the external diameter of the closure's lower face surface lesser portion comprises not more that 1,1 of the closure's lower part internal diameter.

The valve seat can have a ring ledge 13 with the external diameter equal to the internal diameter of the cylindrical part 6. Said ring ledge provides additional operational stability and the reduction of longitudinal loads, effecting the valve closure, operating in low working medium flow rate mode, said working medium flowing via the drain hole 14.

Figure 2:
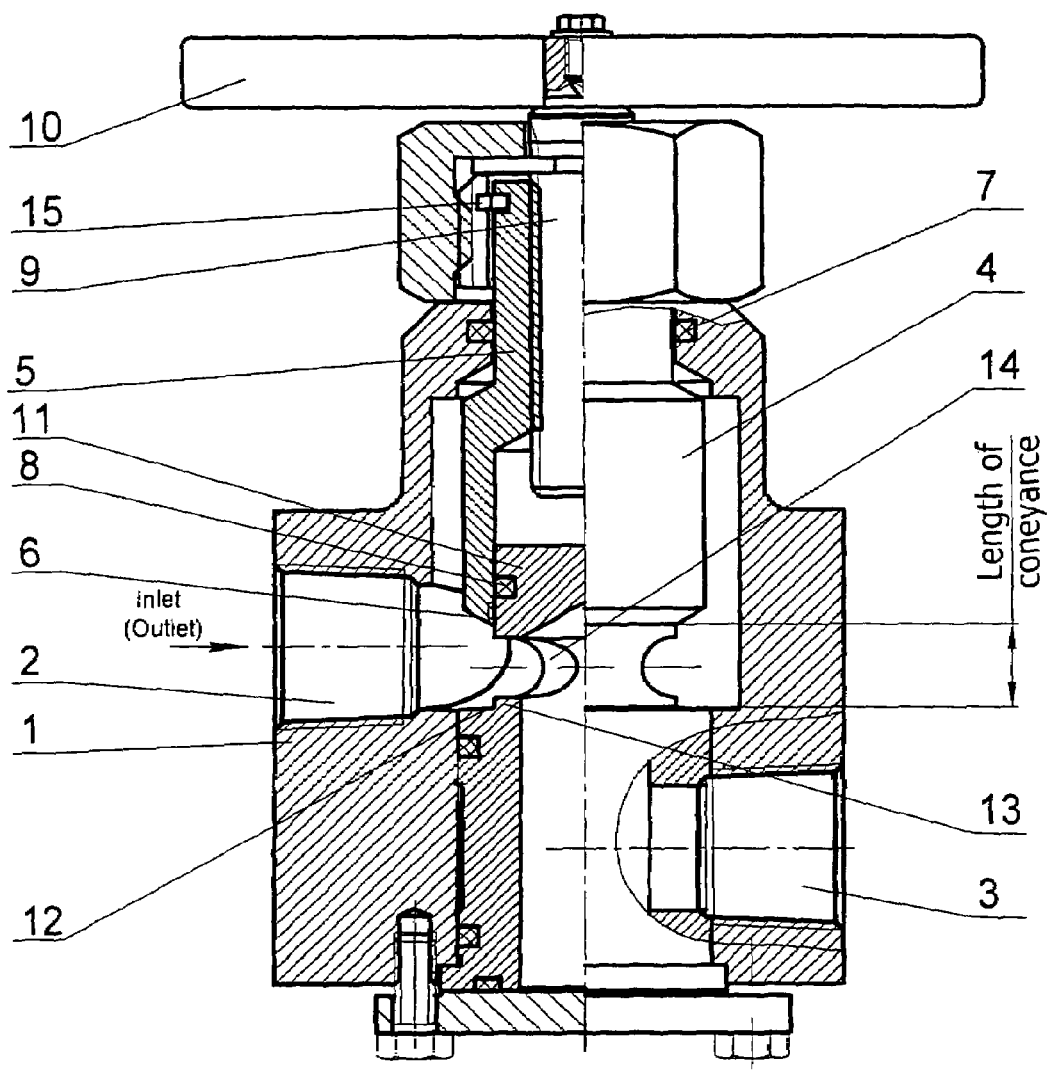

FIG. 2 presents a valve, comprising the same design elements as the one, presented in FIG. 1, the only difference being in that the body 1 comprises two parts, whereas the cylindrical insert is embodied in the form of a pin. One end of said pin is greater in diameter and serves as a guide for the cylindrical part 6 of the sleeve 4, whereas the other end is fixed tightly to the lower part of the body 1. The valve seat 12 is located on the protruding conic part of the body 1, whereas the inlet and outlet holes are located on the same axis, which is in angular position relative to the sleeve 4 axis of movement. Such valve design facilitates the positioning of the inlet 2 and outlet 3 holes on the same axis with the pipeline.

Figure 3:
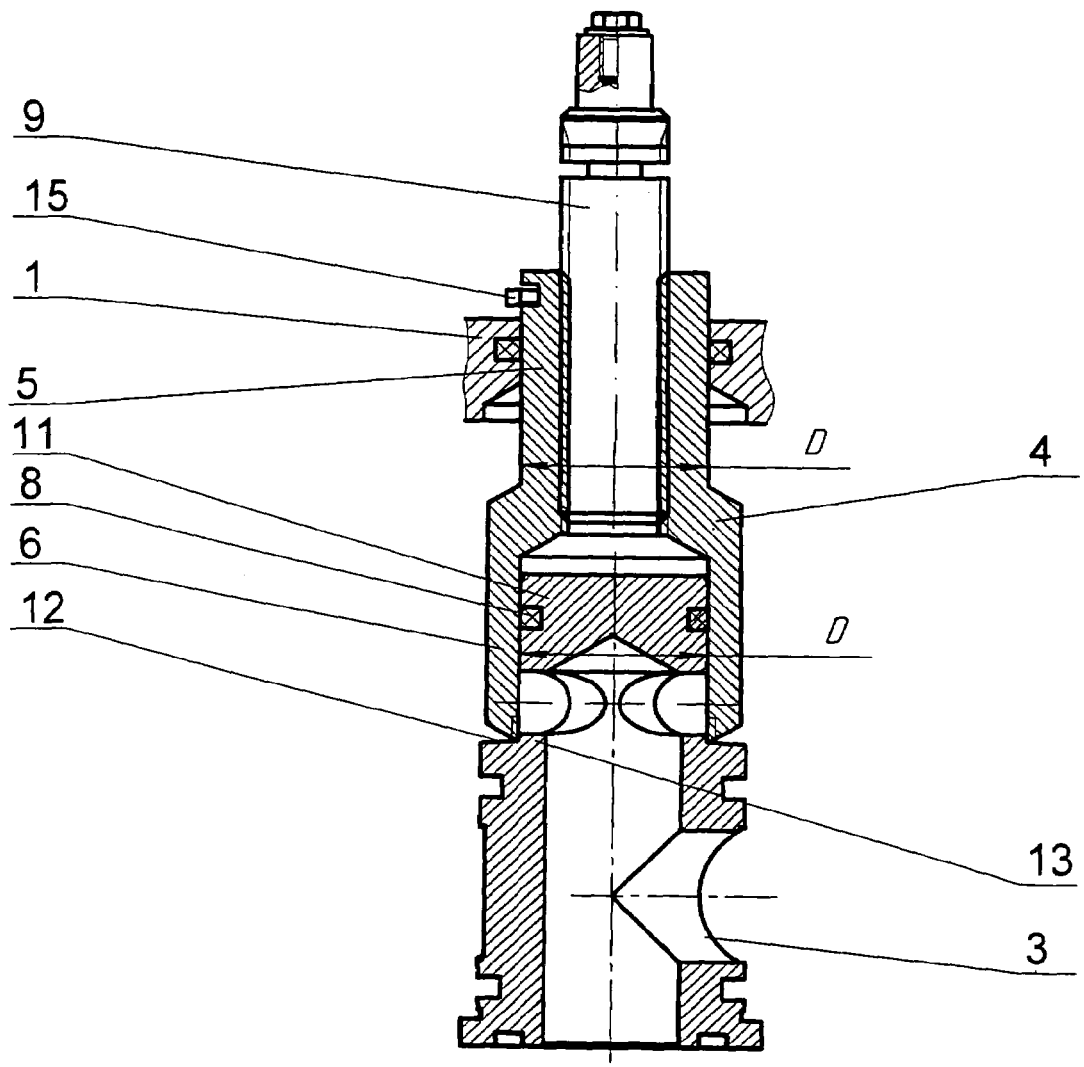

FIG. 3 presents a valve similar to the valves, presented in FIGS. 1 and 2, the only difference being in that one end of the cylindrical insert 4 is fixed in the upper part of the body whereas the other end is fixed in the cylindrical part 6 of the sleeve 4. The flywheel 10 has a cylindrical part with the cylindrical screw 9.

Figure 4:
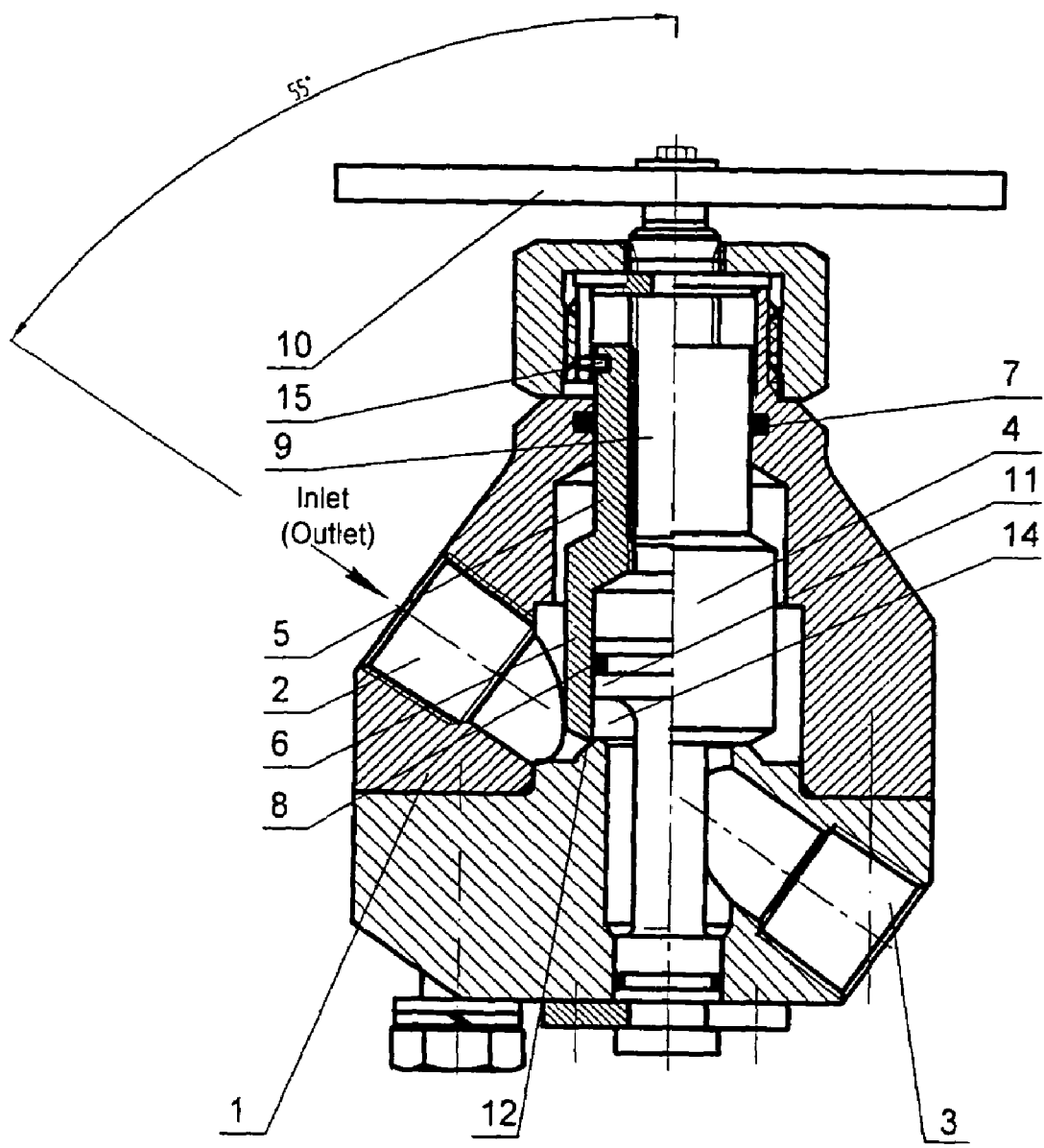

FIG. 4 presents a valve, comprising design elements similar to these of preceding valves, the only difference being in that the body 1 is embodied in the form of a cylinder with inlet (outlet) hole 2, where a cone with the seat 12 is located. The outlet (inlet) hole 3 is located on the same axis with the hole 2 and the valve body. The axis of the flywheel 10 is located at right angle to the axis of the valve and sleeve 4. The movement of the sleeve 4 is accomplished by the flywheel 10 via the screw 9, which can be replaced by gear or other kind of mechanical drive.

The valves, presented in FIG. 1, FIG. 2, FIG. 3 and FIG. 4 can be positioned in space any way.

The valve operates in the following way:

With the valve in the open position the closure 4 is raised in such a way, that the cylindrical part's 6 external surface upper portion does not contact the valve body while the longitudinal forces, formed by the pressure of the working medium, e.g. fluid or gas, effecting the cylindrical part's 6 external surface upper portion and the lower face portion of said part balance each other, therefore no forces from the drive are required to fix the sleeve 4 in position. Besides, the claimed position facilitates a free flow of working medium between the inlet and outlet holes, i.e. the lower edge of the sleeve 4 must be located above the upper limit of the drain hole 14.

When closing the valve, the drive provides for the down movement of the sleeve 4, when, as it was described above, no radial force is formed, therefore the power, developed by the drive is spent to overcome the friction forces between the sleeve 4 and the seal assemblies. The sleeve 4 down movement provides a gradual closing of the drain hole 14 by the lower cylindrical part 6 and reduces the valve open flow area. Further, when the lower edge of the lower cylindrical part 6 passes the upper limit of the cylindrical ledge 13 of the valve seat, there occurs nearly complete stoppage of the working medium flow. If the valve is manufactured without a cylindrical ledge on the valve seat and also to increase the leakproofness of the valve, having said ledge, the sleeve 4 is moved down till its lower edge contacts the valve seat, which results in the complete stoppage of the working medium flow. As the lower face portion of the lower cylindrical part 6 contacts the surface of valve seat on a relatively insignificant area, the longitudinal force, induced by the pressure of the working medium has practically no effect on the sleeve 4 when the valve is in the closed position. Therefore the closure does not require the application of the longitudinal force to keep the valve in the closed position. Besides, the effort to open the valve is spent to overcome the friction forces only.

An important characteristic of the valve of the design, facilitating the balancing of the closure is the independence of the power, required to close the valve with the specified speed from the pressure of the working medium. This provides for the stable operation of the valve in the working medium of any pressure, which constitutes an essential advantage of the claimed valve, as compared to the valves of other known designs.

The invention claimed is:

1. A valve comprising a body having an inlet and an outlet, a valve seat, seal assemblies and a closure, connected to a drive, and a cylindrical insert rigidly fixed in said body, said closure comprising a hollow sleeve, open at two positions, mounted in the body and adapted for reciprocal movement along an external surface of the cylindrical insert, wherein the hollow sleeve comprises first and second coupled cylindrical members, the seal assembly including a male seal assembly and a female seal assembly, wherein the cylindrical members of the closure are coupled to the drive and located in the female seal assembly, and wherein the male seal assembly is located inside the second cylindrical part on the external surface of the cylindrical insert.

2. The valve, according to claim 1, wherein an external diameter of the first cylindrical part which contacts the body being 0.9-1.1 off the internal diameter of the second cylindrical part thereof contacting the cylindrical insert.

3. The valve, according to claim 1, wherein the drive facilitates axial movement of the closure.

4. The valve, according to claim 1, the closure comprising a lower face, whereinthe lower face of the closure which contacts the valve seat is embodied in the form of a truncated inverted cone.

* * * * *